UNITED STATES PATENT OFFICE.

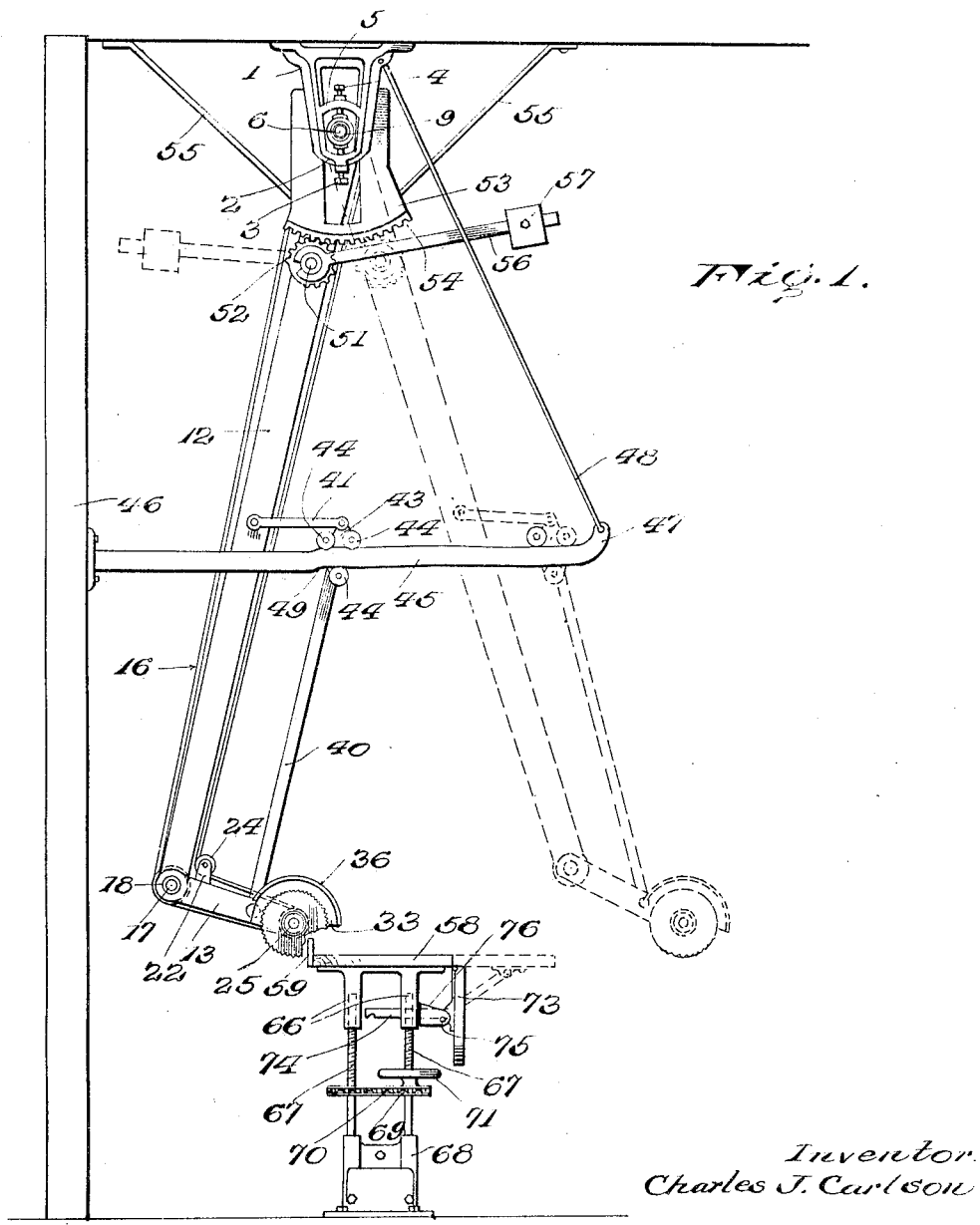

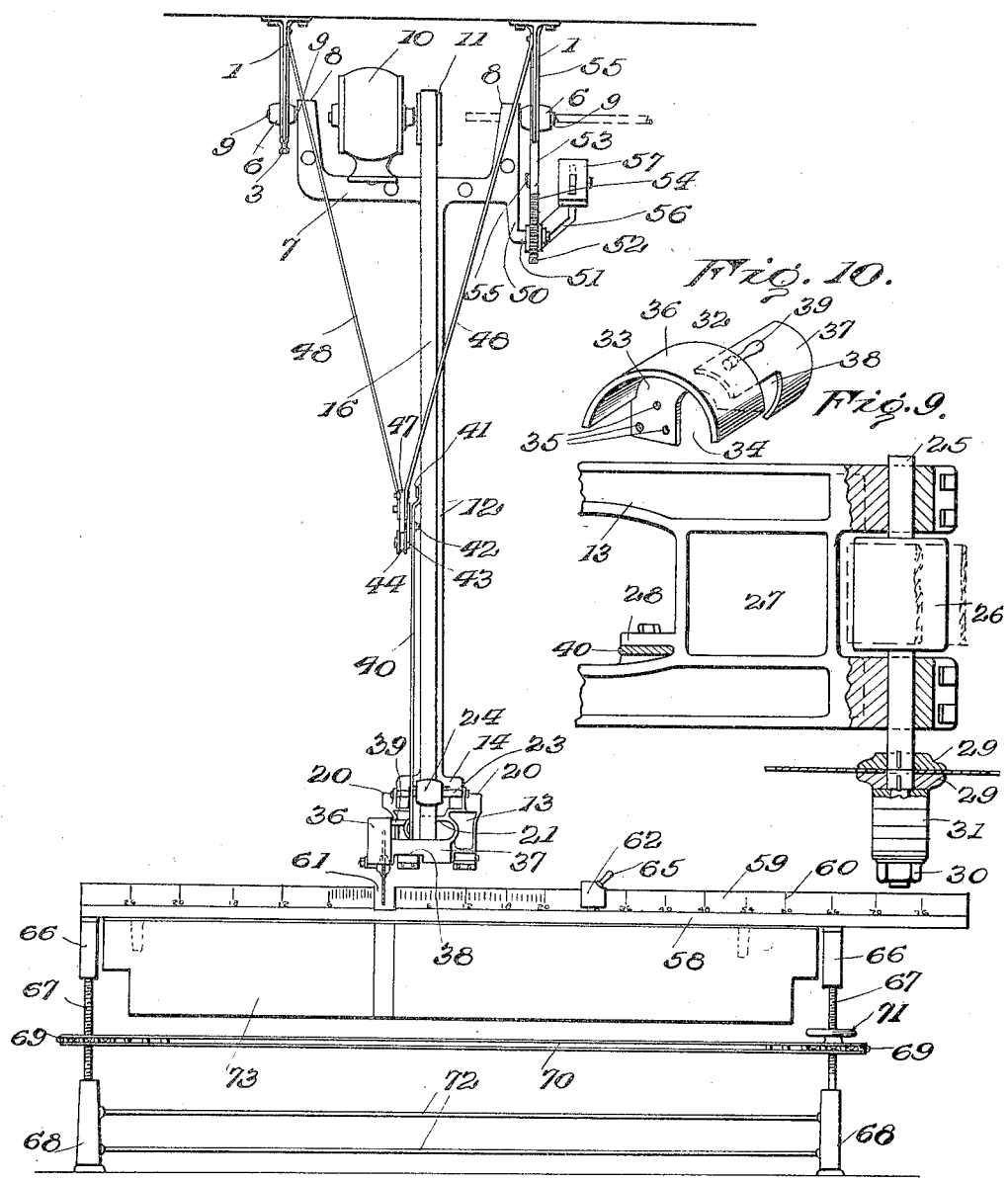

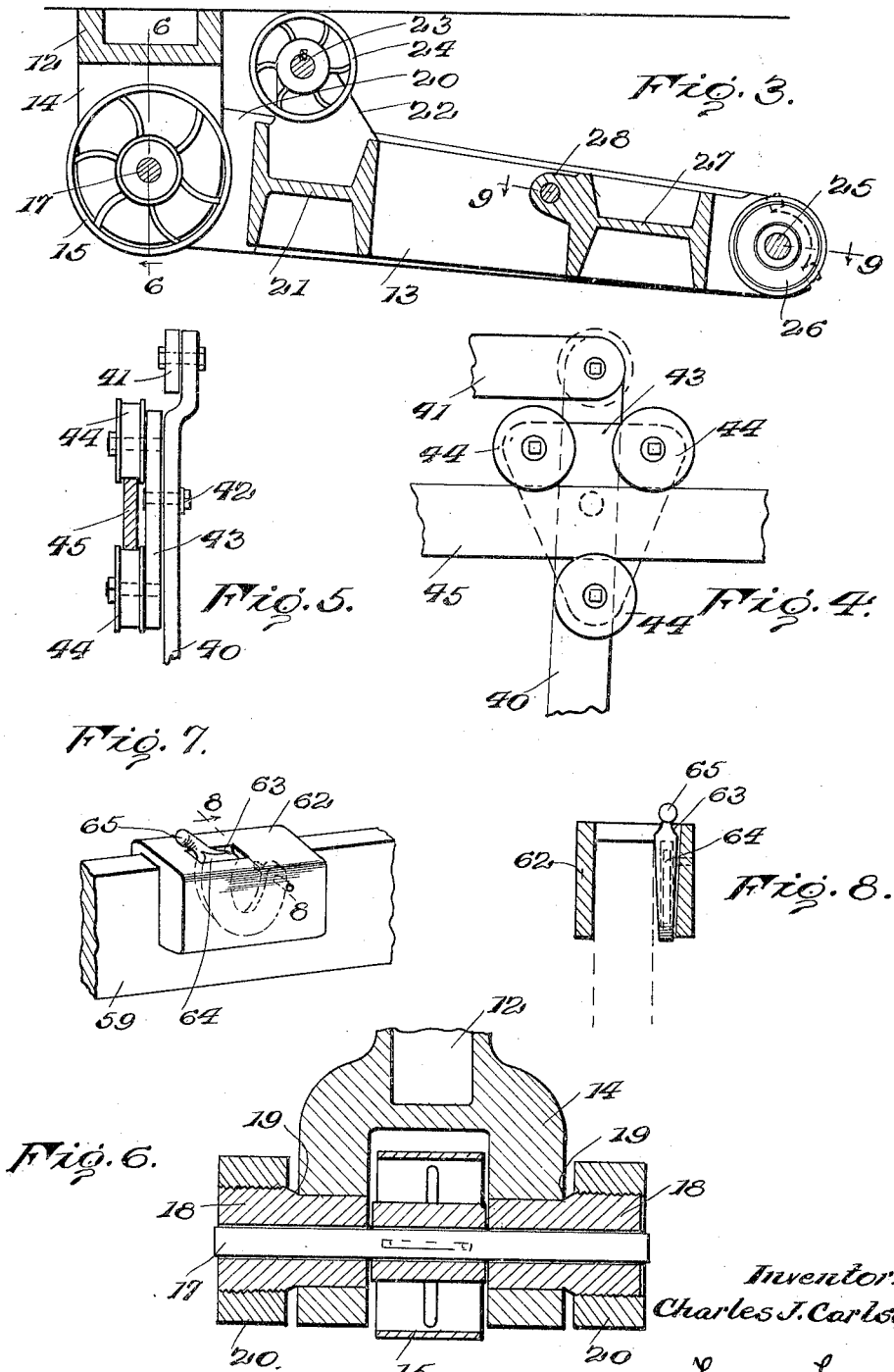

CHARLES J. CARLSON, OF HELENA, MONTANA.

SAWING-MACHINE.

1,373,864.　　　　　Specification of Letters Patent.　　Patented Apr. 5, 1921.

Application filed December 31, 1919. Serial No. 348,540.

*To all whom it may concern:*

Be it known that I, CHARLES J. CARLSON, a citizen of the United States, residing at Helena, in the county of Lewis and Clark and State of Montana, have invented certain new and useful Improvements in Sawing-Machines, of which the following is a specification.

This invention relates to that class of sawing machines in which a saw mounted to swing about an overhead support is employed to cut lumber into predetermined lengths or to cut grooves in the surfaces of any number of pieces of lumber at set distances from the ends thereof. The invention seeks to provide a machine in which the saw will be mounted to move in a horizontal plane and be properly balanced in all its positions so that the labor involved in holding the saw to its work will be minimized. Another object of the invention is to provide novel means for guiding the saw as it moves across the work and arresting its travel at the limits of its movement. Another object of the invention is to provide a novel mounting for the saw and also to improve the swinging frame which carries the saw, and a still further object of the invention is to provide a novel construction of guide whereby to maintain the saw in a horizontal plane while it is at work. A further object of the invention is to provide means to prevent injury to the workmen by contact with the saw blade and also to provide means for adjusting the table or work support so that the saw will penetrate the work to the proper depth and also to provide means whereby the work will be accurately located in proper position upon the work support.

The several stated objects of the invention and other objects which will appear in the course of the following description are attained in a mechanism of the type illustrated in the accompanying drawings and the invention resides in certain novel features which will be particularly pointed out in claims following a detailed description.

In the drawings—

Figure 1 is an end elevation of an apparatus embodying my present invention;

Fig. 2 is a front elevation of the same;

Fig. 3 is an enlarged longitudinal section through the saw frame;

Fig. 4 is a side elevation of the guiding carrier;

Fig. 5 is a front elevation of said carrier;

Fig. 6 is a detail section on the line 6—6 of Fig. 3;

Fig. 7 is a perspective view of the adjustable stop;

Fig. 8 is a detail section on the line 8—8 of Fig. 7;

Fig. 9 is a section on the line 9—9 of Fig. 3;

Fig. 10 is a detail view of the safety hood.

In carrying out my invention, I secure to the ceiling of the workroom or to some other overhead fixed support hangers 1 which are spaced apart and properly alined to support the swinging frame and a line shaft. These hangers, as shown most clearly in Fig. 1, are each of spider or open construction and in the lower cross bar 2 of each hanger is mounted a set screw or adjusting bolt 3 to coact with a similar screw or bolt 4 in an upper arched web 5 to support a bearing sleeve or box 6. By properly adjusting the screws or bolts 3 and 4 of the two hangers, the boxes or sleeves 6 may be readily brought into axial alinement and in the same horizontal plane so that the saw-supporting frame will be level at all times. The saw frame comprises an upper U-shaped portion 7 having upstanding ends 8 from the extremities of which trunnions 9 project to rotatably engage within the boxes 6 and, as shown most clearly in Fig. 1, the trunnions 9 are hollow so that the line shaft may pass through the said trunnions and will journal in the same, the result being that the weight of the frame is carried by the boxes 6 and not by the shaft and the frame may oscillate about the shaft as a center without interfering in any way with the rotation of the shaft. While the construction is thus adapted to be employed in connection with a line shaft driven from some prime motor, I prefer to dispense with a line shaft and mount upon the frame an electric motor, indicated conventionally at 10, having a pulley 11 upon one end of its shaft. As shown clearly in Fig. 2, this motor may be secured upon the base of the U-shaped portion 7 of the main frame and will, of course, be fixed in place so that it will move in unison with the frame. The shaft of this motor will preferably be in axial alinement with the trunnions or bearings and the pulley 11 will be arranged over the main depending arm 12 of the frame, the said arm having the saw frame 13 pivotally attached to its lower end as will be readily understood.

The lower extremity of the depending bar 12 is forked or formed into a yoke 14 within which is received an idler pulley 15 about which is trained the belt 16 which operatively connects the pulley 11 with a pulley on the saw shaft. The idler pulley 15 is carried by a shaft 17 which is journaled in sleeves 18 engaged in openings provided therefor in the side members of the yoke 14 and the said sleeves are expanded at their outer ends so as to provide annular shoulders 19 to engage against the outer sides of the yoke 14 and thereby prevent endwise movement of the sleeves and the shaft. The outer extremities of these sleeves are externally threaded so as to be secured in the rear extremities of the side members 20 of the saw frame 13. The side members 20 of the saw frame are connected near their rear ends by a transverse bracing web 21 and upon the upper edges of the said side members in alinement with the said web are lugs or ears 22 in which is journaled a shaft 23 carrying an idler pulley 24 under which the belt 16 passes, the saw shaft 25 being carried by the forward ends of the said side members 20 and the belt 16 passing from the idlers 15 and 24 to and around a pulley 26 on the said saw shaft. A second transverse bracing web 27 is provided between the side members 20 adjacent the front ends thereof and upon the rear side of this web 27 is a perforated lug 28 for a purpose which will be presently stated. The pulley 26 is secured to the saw shaft 25 in any preferred manner so that the motion of the pulley will be transmitted directly to the shaft and the said shaft extends beyond one side member 20 of the saw frame to constitute a mandrel upon which the saw is fitted and to which it is secured by clamping plates 29 and a nut 30, spacers 31 being disposed between the nut and the adjacent clamping plate so that saws of various thicknesses may be employed in a well-known manner.

To prevent the hands of the workmen coming in contact with the rapidly rotating saw, I secure to the side of the frame 13 adjacent the saw, a hood 32 consisting essentially of a plate 33 having a semi-circular notch or recess 34 at the center of its lower edge to fit around the inner clamping plate 29 and provided in rear of said recess or notch with openings 35 through which bolts or screws may be inserted into the adjacent side member of the saw frame so as to rigidly secure the hood in place. The upper edge of this plate 33 is arcuate and an arcuate cap 36 extends outwardly over the saw blade, as shown in Fig. 2 and as will be readily understood. From the opposite face of the plate 33, a cap 37 extends over the side of the frame 13 and over the pulley 26, this cap 37 being provided with a notch 38 in its lower front edge to clear the side member of the frame 13 and the said cap being of arcuate form so that it may fit closely to the pulley 26 and thereby prevent the clothing of the workmen catching in the driving belt. The forward or lower edge of the cap 37 extends below the edge of the plate 33 so that it will properly inclose the pulley and will also serve as a guard to prevent the belt flying from the pulley. Above the cap 37, a handle 39 projects laterally from the main plate 33 of the hood and this handle forms a ready means for enabling the saw to be moved back and forward across the work by the operator.

Disposed in front of the main bar 12 of the saw supporting frame is a swivel bar 40 which has its lower end pivotally attached to the lug 28 of the web 27 and has its upper end pivoted to the front end of a link 41 which is pivoted at its rear end to the main bar 12. Near its upper end, the swivel bar 40 carries a bolt 42 upon which is pivoted a carrier 43 consisting of a plate having rollers 44 mounted upon its side adjacent its upper and lower ends and adapted to travel upon a track 45. The track 45 consists of a narrow bar secured at its rear end to the side wall of the workroom or to some other fixed support, indicated at 46, and having its front end turned upwardly, as shown at 47, and connected by brace rods 48 with the hangers 1 or with the ceiling of the workroom. At an intermediate point of its length, the track may be bent slightly downwardly, as shown at 49, to provide a stop which will limit the rearward movement of the saw support and permit it to drop slightly so as to pass below the surface of the table and thereby bring the hood 32 closer to the table and further guard against contact with the saw by persons who may be passing or working near the same. It will be readily understood that the upturned front extremity of the track serves as a stop to limit the forward movement of the saw support and will thereby prevent excessive strain upon the working mechanism and also prevent the saw being brought unduly forward. Moreover, the provision of this track and carrier will reduce the strain on the pivotal supports of the frame in the hangers and will hereby aid in preventing bending of the pivot members.

At one end of the upper member 7 of the saw support, I provide a depending arm 50 having a lateral stud 51 at its lower end and upon the said stud is rotatably fitted a pinion 52. To the adjacent hanger 1, I secure a plate 53 which depends below the hanger and has a rack 54 formed on its lower end, the said rack being concentric with the box 6 so that the pinion 52 may move easily and properly along the rack as the saw supporting frame is oscillated. The rack plate 53 may be held against relative movement by braces 55 extending from its front and rear edges to the ceiling or other fixed support and secured to the pinion 52 is a counterbalance arm 56 upon which is adjustably secured a weight 57. It will be readily understood that as the main bar or arm 12 of the saw support is swung rearwardly or forwardly the pinion 52 will be caused to travel along the rack 54 and will be thereby rotated. The rotation of the pinion will cause the counterbalance arm 56 to swing about the center of the pinion and the weight will thus be shifted so as to properly counterbalance the arm 12. When the saw is not in use and the parts are at rest, the counterbalance will project forwardly but as the saw is drawn forward the counterbalance will swing upwardly and rearwardly and when the saw reaches the forward limit of its movement the counterbalance arm will be projecting rearwardly approximately in a horizontal plane, the weight being directly over the saw when the saw is in the vertical plane of the driving shaft.

The work is supported upon a bench or table 58 having a rail 59 along its rear edge. Upon the front face of this rail are graduations, indicated at 60 in Fig. 2, and preferably consisting of a scale marked in feet and inches. The rail 59 is interrupted in the vertical plane of the saw blade, as shown at 61, to permit the saw to pass and upon the rail is fitted an adjustable stop 62 against which the end of the work may be placed so as to properly position the same and permit the saw to operate at the predetermined point. The stop 62 consists of an inverted U-shaped body having a recess 63 in one side wall and in the said recess is pivotally mounted a clamping lever 64 having a handle 65 at its free end whereby it may be easily manipulated and having its side walls diverging from its pivot point to the handle, as clearly shown in Fig. 8, whereby the lever will be given a wedge-like form and will be caused to bind between the rail 59 and the adjacent wall of the stop body 62 and hold the stop at the point of the rail where it may be set. The stop is set at the proper point of the rail, as indicated by the graduations thereon, to cause the end of the lumber abutting the stop to be at the desired distance from the path of the saw and, consequently, when the saw is moved across the work it will operate to cut off the desired length or to make a groove at the desired distance from the end of the lumber.

To adjust the bench or table 58 vertically and thereby permit the saw to operate on lumber of different thicknesses or to penetrate the work to a desired depth, I provide on the under side of the bench depending sockets 66 which are engaged by vertically disposed screws 67 having their lower ends swiveled or otherwise mounted in supporting bases 68 suitably anchored to the floor of the workroom. Upon each of the screws or threaded rods 67 is a sprocket pinion 69 and around the said pinions is trained a sprocket chain 70 so that simultaneous movement of all the sprockets will be effected. To one of the sprockets is connected a hand wheel 71 so that the desired adjustment may be very readily accomplished. To prevent spreading of the bases 68, I extend stay rods 72 between the same, the ends of said rods being firmly secured in the respective bases as will be readily understood.

To accommodate work which may be wider than the average run of work, I hinge to the front edge of the bench or table a leaf 73 to which is pivoted a latch or brace 74 adapted to engage a stop rod 75 carried in brackets 76 below the table so that if the latch be engaged upon the said rod the leaf will be firmly supported in its raised position and when the leaf is lowered the latch may ride over the rod and be supported by the same out of the way under the table.

It is thought the operation of the apparatus will be readily understood from the foregoing description, taken in connection with the accompanying drawings. Motion is imparted to the belt 16 through the line shaft or by the motor 10 as will be readily understood and this motion will be transmitted to the saw through the pulley 26 and the saw mandrel. The saw is drawn steadily forward by the workman over the work upon the bench or table 58 and will rotate constantly so that as it advances it will cut through the work. The saw frame 13 is pivotally connected with the swinging arm 12 and the swivel bar 40 serves to maintain the saw at a constant distance below the track 45 so that the travel of the saw forwardly and rearwardly will be in a horizontal plane. The swivel bar will readily follow the movement of the swinging arm 12 inasmuch as it is connected with said bar through the link 41 and the saw frame 13 and the pivotal connection of the swivel bar with the carrier will prevent bending of the bar or the carrier upon the track while at the same time the carrier will be caused to move in a horizontal rectilinear path by the track and the saw thereby held to travel in a horizontal plane. The cut made by the saw will consequently be of uniform depth from end to end. Inasmuch as the saw is counterbalanced in all its positions it may be swung forwardly or backwardly very easily and no part of the weight of the saw is to be sustained by the operator. The several parts are simple in their construction and compact in their arrangement. They are not liable to get out of order and will be found efficient and durable in use.

Having thus described the invention, what is claimed as new is:

1. In an apparatus of the class described, the combination of a frame mounted at its upper end to swing about a fixed point, a saw frame pivotally connected to the lower end of said swinging frame and extending forwardly therefrom, a saw carried by the front end of the saw frame, a swivel bar pivoted at its lower end to the saw frame, a link connecting the upper end of said bar with the swinging frame, a horizontal track adjacent the swivel bar and the swinging frame and parallel to the plane of movement thereof, and a carrier pivoted to the swivel bar near the upper end thereof and arranged to travel on said track.

2. In an apparatus for the purpose set forth, the combination of a horizontal track, a swinging frame mounted to swing about a fixed point above the track and extending below the same, a saw frame pivotally connected with and extending forwardly from the lower end of said frame, a saw carried by the front end of said saw frame, a swivel bar having its lower end pivoted to the said saw frame near the front end thereof, a link pivoted at its rear end to the swinging frame and at its front end to the upper end of the swivel bar, a carrier pivoted on the side of the swivel bar near the upper end thereof, and rollers on said carrier arranged to travel upon the upper and lower edges respectively of the track.

3. In an apparatus for the purpose set forth, the combination of a horizontal track, a swinging frame mounted to swing about a fixed point above the track and extending below the same, a saw frame pivotally connected with and extending forwardly from the lower end of said swinging frame, a saw carried by the front end of said saw frame, a swivel bar having its lower end pivoted to the saw frame near the front end thereof, a link pivoted at its rear end to the swinging frame and at its front end to the upper end of the swivel bar, a carrier consisting of a vertically disposed plate arranged between the swivel bar and the track and having a pivotal connection intermediate its height with the swivel bar near the upper end of the same, and rollers mounted on the side of said plate remote from the swivel bar and arranged to travel on the upper and lower edges respectively of the track.

In testimony whereof I affix my signature.

CHARLES J. CARLSON. [L. S.]